United States Patent Office 3,257,433
Patented June 21, 1966

3,257,433
$\Delta^{5,9(11),16}$-PREGNATRIEN-3$\beta$-OL-20-ONE
Carl Djerassi and Albert Bowers, Mexico City, Mexico, assignors, by mesne assignments, to Syntex Corporation, a corporation of Panama
No Drawing. Filed Dec. 18, 1959, Ser. No. 860,337
Claims priority, application Mexico, Dec. 20, 1958, 53,142
8 Claims. (Cl. 260—397.45)

This invention relates to new cyclopentanophenanthrene derivatives which are fungicides, anti-fibrillatory agents, and also valuable intermediates for the manufacture of cortical hormones of high therapeutic value, such as 9$\alpha$-fluoro-cortisone and 9$\alpha$-fluoro-cortisol.

Such cortical hormones may be prepared from the intermediates, the production of which is the object of the present invention, for example, formation of the 16$\alpha$,17$\alpha$-epoxide; opening of the epoxide with hydrogen bromide to give the 17$\alpha$-hydroxy-16$\beta$-bromo derivative; removal of the bromine atom by known procedures; formation of the $\Delta^4$-3-keto grouping, by oxidation of the $\Delta^5$-3-hydroxy grouping with Jones reagent and rearrangement of the double bond; treatment of the resulting $\Delta^{4,9(11)}$-diene with hypobromous acid in accordance with the method of J. Fried and E. Sabo (loc. cit.), to obtain the 9$\alpha$-fluoro-11$\beta$-hydroxy compound; introduction of the 21-acetoxy group by treatment with iodine in the presence of calcium oxide followed by reaction of the 21-iodo compound with potassium acetate, and finally, if desired, oxidation of the 11$\beta$-hydroxy group to an 11-keto group using Jones reagent.

The aforesaid new intermediates according to the invention can be represented by the following formula:

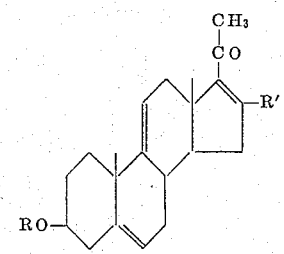

wherein R' represents hydrogen or lower alkyl and R represents hydrogen or the acyl radical of a hydrocarbon acid of up to 12 carbon atoms and which may be of straight or branched chain, saturated or unsaturated. Typical for such acyl radicals are the formyl, acetyl, propionyl, benzoyl and trimethylacetyl groups.

These new compounds can be obtained from botogenin ($\Delta^5$-22$\alpha$,25a-spirosten-3$\beta$-ol-12-one) which is easily available from certain Mexican plants and also from such sapogenin as correllogenin ($\Delta^5$-22$\alpha$,25b-spirosten-3$\beta$-ol-12-one), preferably in the form of their acetates or other esters of hydrocarbon carboxylic acids having up to 12 carbon atoms, by a process which is illustrated in the following reaction diagram (R" being either hydrogen or acetyl):

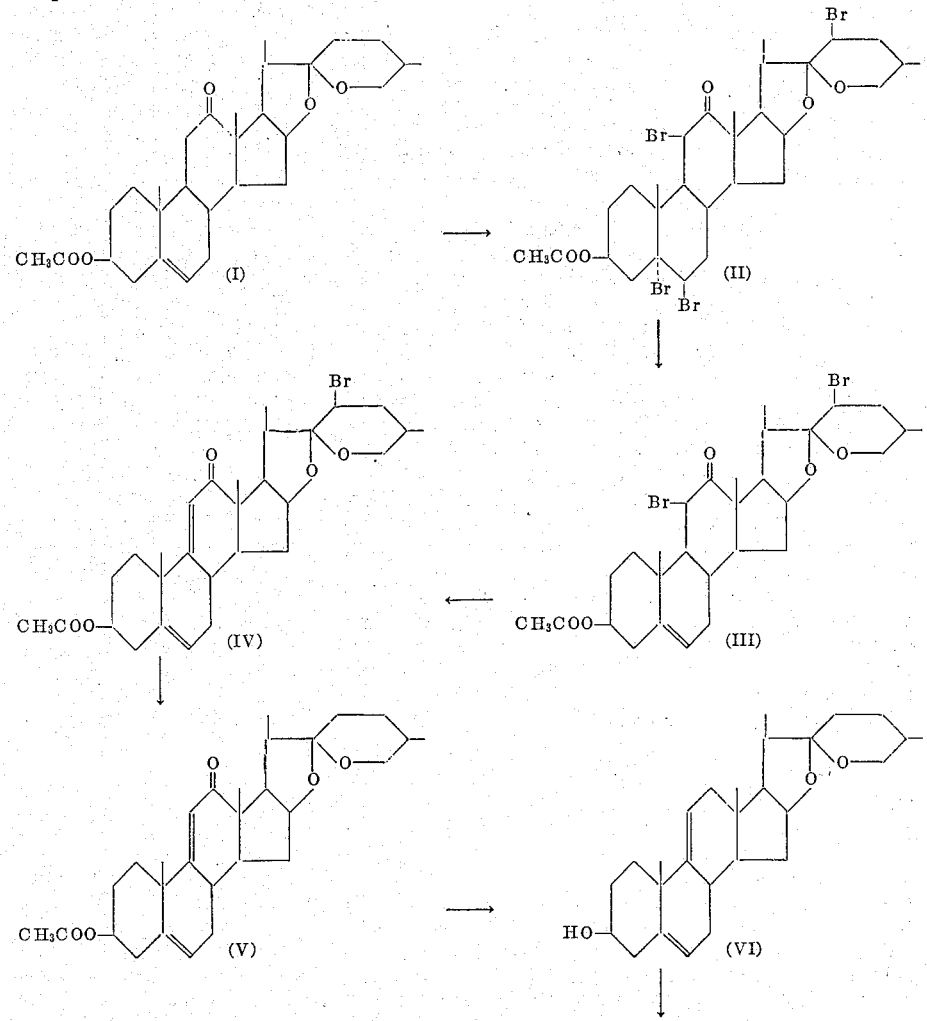

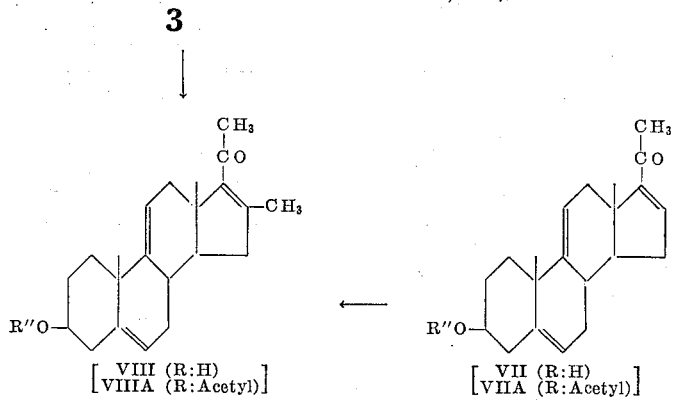

[VIII (R:H)]
[VIIIA (R:Acetyl)]

[VII (R:H)]
[VIIA (R:Acetyl)]

The above process comprises the conversion of a starting sapogenin such as $\Delta^5$-22α,25a- or $\Delta^5$-22α,25b-spirosten-3β-ol-12-one acetate (I) via the corresponding 5α,6β,11β,23-tetra-bromo derivative (II), to the 11β,23-dibromo derivatives (III) by a method described by Rothman and Wall in J. Am. Chem. Soc., 29, 3228 (1957), and further treatment of 11,23-dibromo-$\Delta^5$-22α,25a- and/or 25b-spirosten-3β-ol-12-one acetate (III) with calcium carbonate in mixture with dimethylacetamide, at the reflux temperature. There was first formed 23-bromo-$\Delta^{5,9(11)}$-22α,25a- and/or 25b-spirostadien-3β-ol-12-one acetate (IV) which was subjected to a reductive debromination, preferably with zinc in mixture with an organic solvent such as ethanol, to produce $\Delta^{5,9(11)}$-22α,25a and/or 25b-spirostadien-3β-ol-12-one acetate (V).

This substance was allowed to react with hydrazine hydrate in mixture with ethylene glycol at the reflux temperature and then with alkali, thus yielding $\Delta^{5,9(11)}$-22α, 25a- and/or 25b-spirostadien-3β-ol (VI).

The degradation of the spirostane side chain of the latter substance, by reaction with acetic anhydride, oxidation with chromic acid and saponification of the resulting product, furnished $\Delta^{5,9(11),16}$-pregnatrien-3β-ol-20-one (VII).

The latter intermediate can then be converted to one of the above mentioned cortical hormones by the known reaction steps described further above.

16-methyl-corticoids can be obtained via 16-methyl-$\Delta^{5,9(11),16}$-pregnatrien-3β-ol-20-one (VIII). The latter is produced from compound (VII) by conventional acetylation to (VIIA), addition of diazomethane to the C–16,17 double bond of the acetate (VIIA) and thermal decomposition of the resulting pyrazoline. 16-methyl-$\Delta^{5,9(11),16}$-pregnatrien-3β-ol-20-one obtained by saponification of (VIIIA) is then hydrogenated and the resulting 16α-methyl-$\Delta^{5,9(11)}$-pregnadien-3β-ol-20-one is further treated by the steps mentioned hereinbefore in order to obtain the desired 16-methyl corticoids.

Another process for producing these important intermediaries is described in our co-pending patent application Serial No. 860,338 filed as of even date herewith, now U.S. Patent No. 3,051,703.

To those skilled in the art it is obvious that the aforementioned reactions, described in detail in the following examples, can be modified within wide limits. These examples serve to illustrate our invention without limiting its scope.

*Example I*

A solution of 5 g. of 11,23-dibromo-$\Delta^5$-22α,25a-spirosten-3β-ol-12-one acetate, obtained by the method described by Rothman and Wall supra from botogenin, in 100 cc. of dimethylacetamide was added dropwise to a suspension of 2 g. of calcium carbonate in 40 cc. of dimethylacetamide, in the course of 20 minutes. The reaction mixture was refluxed for 30 minutes, filtered and the filtrate was concentrated to a volume of 30 cc. under reduced pressure and then diluted with water. The precipitate formed was collected by filtration, thus giving 23-bromo-$\Delta^{5,9(11)}$-22α,25a-spirostadien-3β-ol-12-one acetate. A pure sample of the compound was obtained by recrystallization from methanol.

A solution of 50 g. of the above compound in 200 cc. of 96% ethanol was mixed with 28 g. of zinc dust and heated under reflux for a period of 8 hours. The zinc was removed by filtration, the solvent was evaporated under reduced pressure and the residue was purified by chromatography on alumina, thus producing $\Delta^{5,9(11)}$-22a, 25a-spirostadien-3β-ol-12-one acetate.

A solution of 4.5 g. of this compound in 105 cc. of ethylene glycol was mixed with 3 cc. of 85% hydrazine hydrate and refluxed for 1 hour. The reaction mixture was cooled, mixed with a solution of 9.2 g. of potassium hydroxide in 10 cc. of water, heated until the temperature of the reaction mixture reached 195° and then refluxed for 8 hours. After cooling and diluting with water the mixture was acidified with hydrochloric acid and the product was extracted with chloroform. The extract was washed to neutral, dried over anhydrous sodium sulfate and the solvent was removed by distillation under reduced pressure, thus yielding the $\Delta^{9(11)}$-derivative without the keto function at C–12.

The compound obtained above (3.6 g.) was heated with 18 cc. of acetic anhydride at 195° C. for 8 hours.

The cooled solution was diluted with an excess of water and kept standing until the unreacted acetic anhydride had hydrolyzed.

The product was extracted with ether and evaporated to dryness. The residue was dissolved in a mixture of 50 cc. of acetic acid and 10 cc. of water, treated at 15° C. with a solution of 2.5 g. of chromium trioxide in 3 cc. of water and kept for 2 hours. The reaction mixture was diluted with water and the product was extracted with ether, washed to neutral, dried over anhydrous sodium sulfate and the ether was removed by evaporation. The residue which is $\Delta^{5,9(11),16}$-pregnatrien-3β-ol-20-one acetate was dissolved in 60 cc. of acetone, treated with a solution of 750 mg. of potassium hydroxide in 15 cc. of water and the mixture was refluxed for 5 hours. It was then diluted with water and the precipitate formed was collected and recrystallized from methanol-water, thus furnishing $\Delta^{5,9(11),16}$-pregnatrien-3β-ol-20-one.

*Example II*

1 mol of $\Delta^{5,9(11),16}$-pregnatrien-3β-ol-20-one is esterified in a conventional manner with 1 mol propionic anhydride and there is obtained $\Delta^{5,9(11),16}$-pregnatrien-3β-ol-20-one propionate.

*Example III*

1 mol of $\Delta^{5,9(11),16}$-pregnatrien-3β-ol-20-one is esterified in a conventional manner with 1 mol benzoic anhydride and there is obtained $\Delta^{5,9(11),16}$-pregnatrien-3β-ol-20-one benzoate.

*Example IV*

1 mol of $\Delta^{5,9(11),16}$-pregnatrien-3β-ol-20-one is esterified in a conventional manner with 1 mol trimethylacetic anhydride and there is obtained $\Delta^{5,9(11),16}$-pregnatrien-3β-ol-20-one trimethylacetate.

Example V 1 mol of $\Delta^{5,9(11),16}$-pregnatrien-3β-ol-20-one is esterified in a conventional manner with excess formic acid and there is obtained $\Delta^{5,9(11),16}$-pregnatrien-3β-ol-20-one formate.

Example VI 5 g. of the end product of Example I was treated with 5 cc. of acetic anhydride and 50 cc. of pyridine for one hour on the steam bath; the resulting product was precipitated by dilution with water and the precipitate was purified by recrystallization from methanol; the acetate of $\Delta^{5,9(11),16}$-pregnatrien-3β-ol-20-one was obtained.

A solution of 7 g. of the acetate of $\Delta^{5,9(11),16}$-pregnatrien-3β-ol-20-one in 200 cc. of an ether solution of diazomethane prepared from 50 g. of nitrosomethyl urea was allowed to react at room temperature for 24 hours and then treated with 5 cc. of acetic acid; the solution was evaporated under reduced pressure in a bath at 40° C. almost to dryness and the residue was crystallized from acetone, thus yielding the 3-acetoxy-pyrazoline, which was decomposed by the thermic procedure described by Wettstein (Helv. Chim. Acta, XXVII, 1803 (1944)), by gradual heating to about 180° C. under vacuum. By recrystallization of the crude product from acetone there was obtained 16-methyl-$\Delta^{5,9(11),16}$-pregnatrien-3β-ol-20-one-acetate. Saponification by conventional methods yielded the free 16-methyl-$\Delta^{5,9(11),16}$-pregnatrien-3β-ol-20-one.

We claim:
1. A compound corresponding to the general formula:

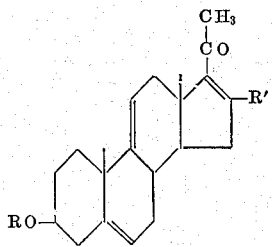

wherein R is selected from the group consisting of hydrogen and the acyl radical of a hydrocarbon carboxylic acid having up to 12 carbon atoms, and R' is selected from the group consisting of hydrogen and methyl.

2. $\Delta^{5,9(11),16}$-pregnatrien-3β-ol-20-one.
3. $\Delta^{5,9(11),16}$-pregnatrien-3β-ol-20-one acetate.
4. $\Delta^{5,9(11),16}$-pregnatrien-3β-ol-20-one propionate.
5. $\Delta^{5,9(11),16}$-pregnatrien-3β-ol-20-one benzoate.
6. $\Delta^{5,9(11),16}$-pregnatrien-3β-ol-20-one trimethylacetate.
7. $\Delta^{5,9(11),16}$-pregnatrien-3β-ol-20-one formate.
8. A compound of the formula:

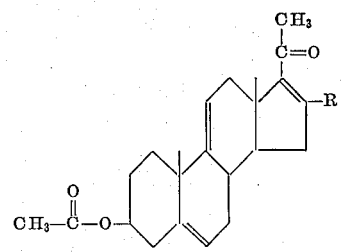

wherein R is selected from the group consisting of hydrogen and methyl.

References Cited by the Examiner

UNITED STATES PATENTS 2,649,400   8/1953   Murray et al. _____ 195—51

OTHER REFERENCES

Bernstein et al.: J.A.C.S., vol. 81, pages 4956–62 (Sept. 20, 1959).

Bowers: J.A.C.S., vol. 81, page 4107 (Aug. 5, 1959).

LEWIS GOTTS, *Primary Examiner.*

LESLIE H. GASTON, IRVING MARCUS, *Examiners.*